(12) United States Patent
Yang

(10) Patent No.: US 7,061,206 B2
(45) Date of Patent: Jun. 13, 2006

(54) METHOD FOR RESTORING BATTERY DATA IN PORTABLE APPLIANCE

(75) Inventor: Seung Hun Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 10/647,135

(22) Filed: Aug. 25, 2003

(65) Prior Publication Data

US 2004/0207405 A1 Oct. 21, 2004

(30) Foreign Application Priority Data

Aug. 24, 2002 (KR) ...................... 10-2002-0050348

(51) Int. Cl.
*H02J 7/00* (2006.01)

(52) U.S. Cl. ..................................... 320/106

(58) Field of Classification Search ............... 320/106, 320/107, 132; 711/154

See application file for complete search history.

(56) References Cited

U.S. PATENT DOCUMENTS

| 5,606,242 A | * | 2/1997 | Hull et al. ................... 320/106 |
| 5,796,239 A | * | 8/1998 | van Phuoc et al. ......... 320/107 |
| 5,955,869 A | * | 9/1999 | Rathmann ................... 320/132 |
| 6,025,695 A | * | 2/2000 | Friel et al. ................... 320/106 |
| 6,880,048 B1 | * | 4/2005 | Lemke ....................... 711/154 |

* cited by examiner

*Primary Examiner*—Pia Tibbits
(74) *Attorney, Agent, or Firm*—Fleshner & Kim, LLP

(57) ABSTRACT

Disclosed is a method for restoring battery data in a portable appliance. The battery data restoring method includes the steps of receiving reference battery data internally set in a battery and adapted to manage the battery, and storing the received reference battery data as backup data, comparing battery data periodically measured for the battery with the stored reference battery data, and updating the reference battery data set in the battery by the stored reference battery data when it is determined in accordance with the comparison that the measured battery data is damaged. Accordingly, it is possible to make the battery be normally used even when the reference data of the battery is damaged, thereby preventing an abnormal operation of the battery charging system.

14 Claims, 3 Drawing Sheets

METHOD FOR RESTORING BATTERY DATA IN PORTABLE APPLIANCE

BACKGROUND OF THE INVENTION

1. Field of the Invention

The present invention relates to a method for restoring battery data in a portable appliance which can restore damaged internal data of a battery used in the portable appliance, thereby making the battery be normally usable.

2. Description of the Related Art

Generally, battery chargers operate to appropriately transform commercial voltage into a desired voltage, and to apply the transformed voltage to a battery, thereby charging the battery. FIG. 1 illustrates the configuration of a battery charging system employed in a general portable appliance. As shown in FIG. 1, the battery charging system includes a battery management module 20 for storing data about a battery 10 in a memory 21 to manage the battery data. The battery data is set in manufacturing the battery 10.

The battery data is reference data associated with voltage, current and capacity. The battery management module 20 stores the reference data of the battery 10 in the form of a temperature-based table in the memory 21 which may be an EEPROM (Electrically Erasable Programmable ROM). The battery management module 20 also periodically measures the temperature, voltage and current of the battery 10, and sends the measured values, as battery data, to a host 30 in a serial communication manner.

The battery management module 20 is provided with a P-MOSFET (Metallic Oxide Semiconductor Field Effect Transistor). The battery management module 20 controls the P-MOSFET, thereby controlling a charging operation according to a desired charge voltage.

The host 30 receives the battery data from the battery management module 20, and utilizes the received battery data to control the battery charging system.

In the above-mentioned general battery charging system, however, there are various problems. That is, when reference signals sent from the host 30 to the battery management module 20 are distorted, or physical impact is applied to the battery 10 or battery management module 20, the reference battery data stored in the memory 21 equipped in the battery management module 20 may be damaged. Such damaged reference battery data may cause an abnormal battery charging operation. Furthermore, the measured data to be sent to the host 30 may be damaged. As a result, the system operates abnormally, thereby causing degradation in the performance of the host 30.

SUMMARY OF THE INVENTION

The present invention has been made in view of the above-mentioned problems, and an object of the invention is to provide a method for restoring battery data in a portable appliance in which initially-set battery data is stored in the form of a backup file so that when the battery data is damaged, it is automatically restored by the backup battery data.

In accordance with the present invention, this object is accomplished by providing a method for restoring battery data in a portable appliance, comprising the steps of: receiving reference battery data internally set in a battery and adapted to manage the battery, and storing the received reference battery data as backup data; comparing battery data periodically measured for the battery with the stored reference battery data; and updating the reference battery data set in the battery by the stored reference battery data when it is determined in accordance with the comparison that the measured battery data is damaged.

BRIEF DESCRIPTION OF THE DRAWINGS

The above objects, and other features and advantages of the present invention will become more apparent after reading the following detailed description when taken in conjunction with the drawings, in which.

DETAILED DESCRIPTION OF PREFFERRED EMBODIMENTS

Hereinafter, preferred embodiments of a method for restoring battery data in a portable appliance according to the present invention will be described in detail with reference to the annexed drawings.

Figure 2:
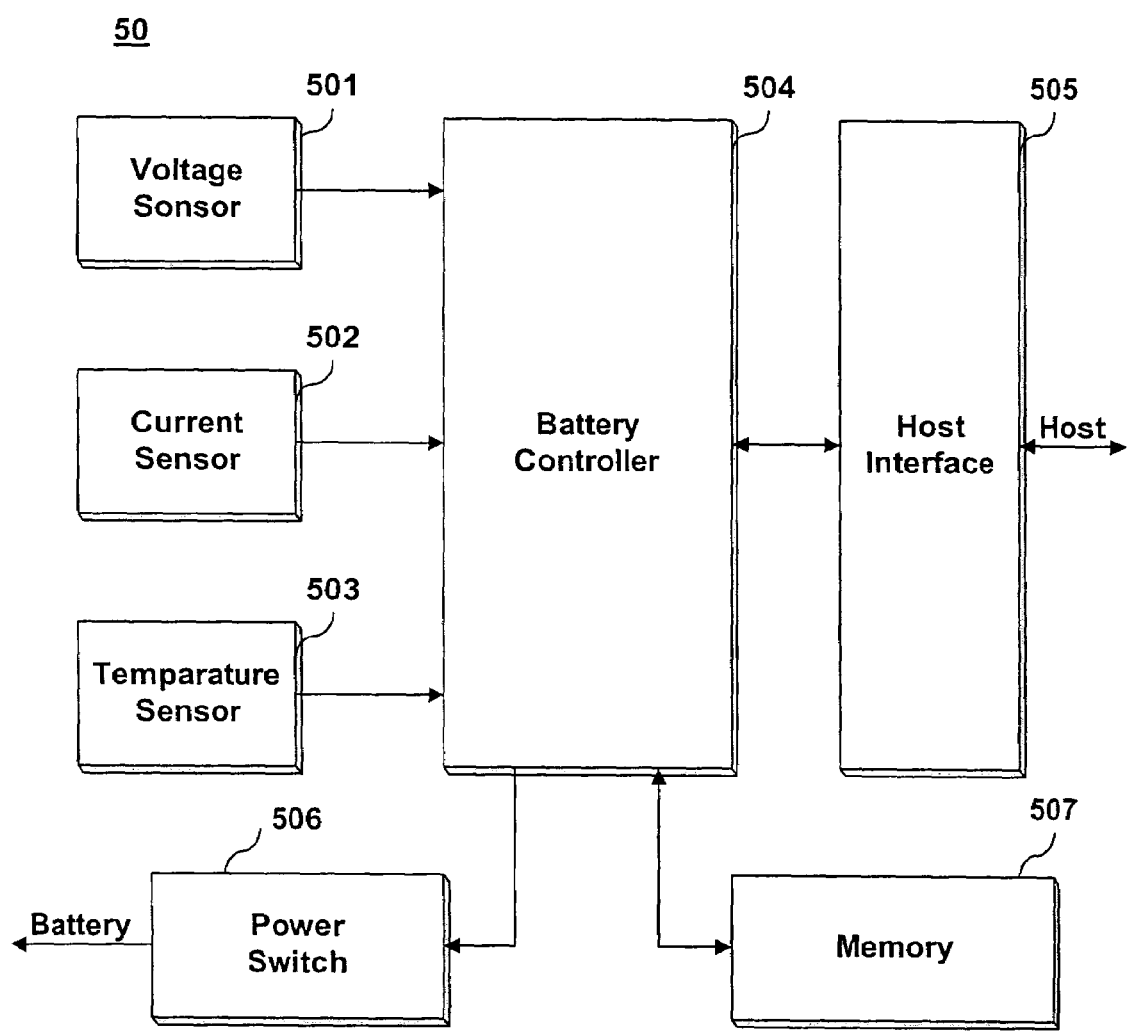
FIG. 2 is a block diagram illustrating the configuration of a battery management module equipped in a portable appliance to which a battery data restoring method according to the present invention is applied.

FIG. 2 illustrates the configuration of a battery management module equipped in a portable appliance to which the battery data restoring method of the present invention is applied.

Figure 1:
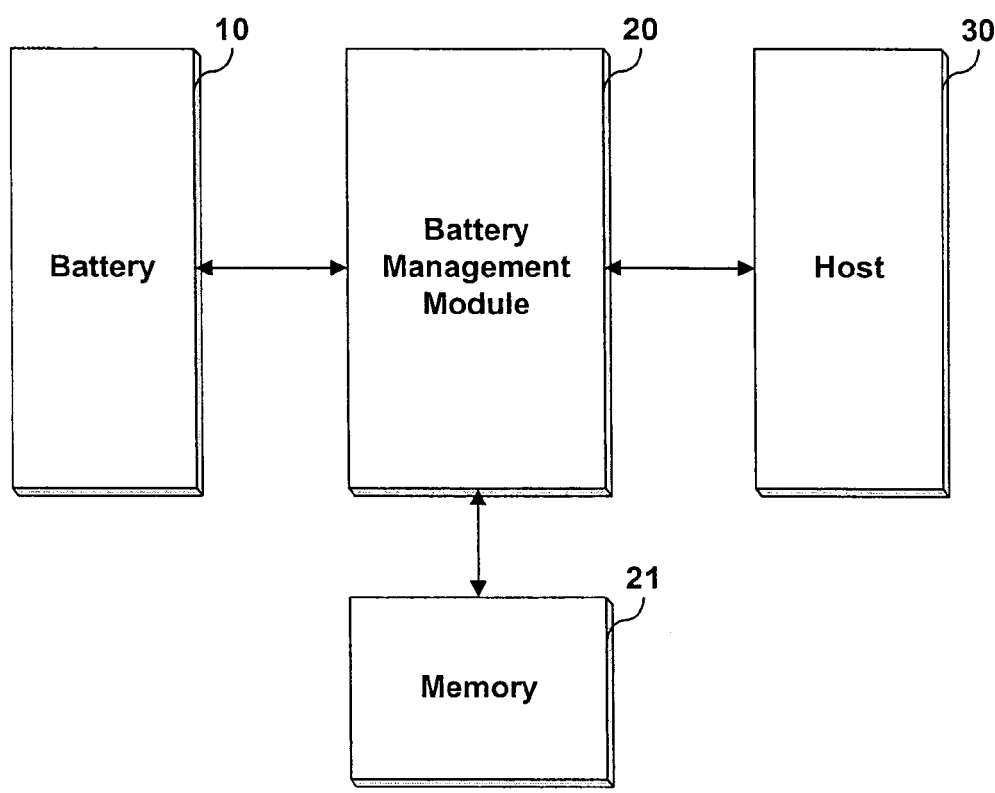
FIG. 1 is a block diagram illustrating the configuration of a battery charging system employed in a general portable appliance.

As described with reference to FIG. 1, the battery management module of such a portable appliance performs the whole battery management including control of a battery charging operation. The battery management module, which is designated by the reference numeral 50 in FIG. 2, periodically measures various data about the battery 10, that is, the voltage, current and temperature of the battery 10, stores the measured data in a memory 507 as control data for operation of a battery controller 54, and sends the stored data to the host 30 at the request of the host 30. The memory 507 also stores reference battery data about the temperature-based reference voltage, current, and capacity of the battery 10. Here, the reference battery data was initially set in manufacturing the battery 10 and has subsequently been updated in accordance with a calibration process.

As shown in FIG. 2, the battery management module 50 includes a voltage sensor for measuring the voltage of the battery 10, a current sensor 502 for measuring the current of the battery 10, and a temperature sensor 503 for measuring ambient temperature around the battery 10, in addition to the battery controller 504 and memory 507. The battery controller 504 collects measured battery data, that is, data about the voltage, current, and temperature of the battery 10 measured by respective sensors 501, 502 and 503, and sends the collected battery data to the host 30 via a host interface 505 at the request of the host 30. The battery controller 504 also controls operation of a power switch 506 such as a P-MOSFET, thereby controlling the voltage to be applied to the battery 10. The memory 507 stores data required for operation of the battery controller 54 along with the reference battery data about temperature-based reference voltage, current, and capacity.

In particular, the battery management module 50 sends battery data periodically measured through the sensors 501, 502, and 503 to the host 30.

When the battery 10 and battery management module 50 are initially connected to the host 30, this host 30 receives, from the memory 507 of the battery management module 50, reference battery data stored in the memory 507, and stores the received reference battery data in a certain memory. When the battery management module 50 receives the measured battery data from the battery management module 50, it determines, based on the stored reference battery data, whether or not the measured battery data is normal.

When it is determined that the measured battery data has been damaged, the host 30 sends the reference battery data stored as backup data to the battery management module 50 which, in turn, updates the damaged reference battery data stored in its memory 507 by the backup reference battery data received thereto.

The battery management module 50 also performs a calibration process for correcting the updated reference battery data, based on the current actual data of the battery 10, because the battery 10 exhibits a gradual reduction in capacity as it is used, by virtue of the characteristics thereof. Accordingly, the battery management module 50 updates the reference battery data by data obtained in accordance with the calibration process, and stores the updated reference battery data in the memory 507.

The calibration process for correcting the stored internal data of the battery 10 determines the capacity of the battery 10 to be '0' in a completely discharged state of the battery 10, while determining the current charge capacity in a completely charged state of the battery 10 as an actual battery capacity. Based on such determined battery capacities, the battery management module 50 updates all reference battery data.

Figure 3:
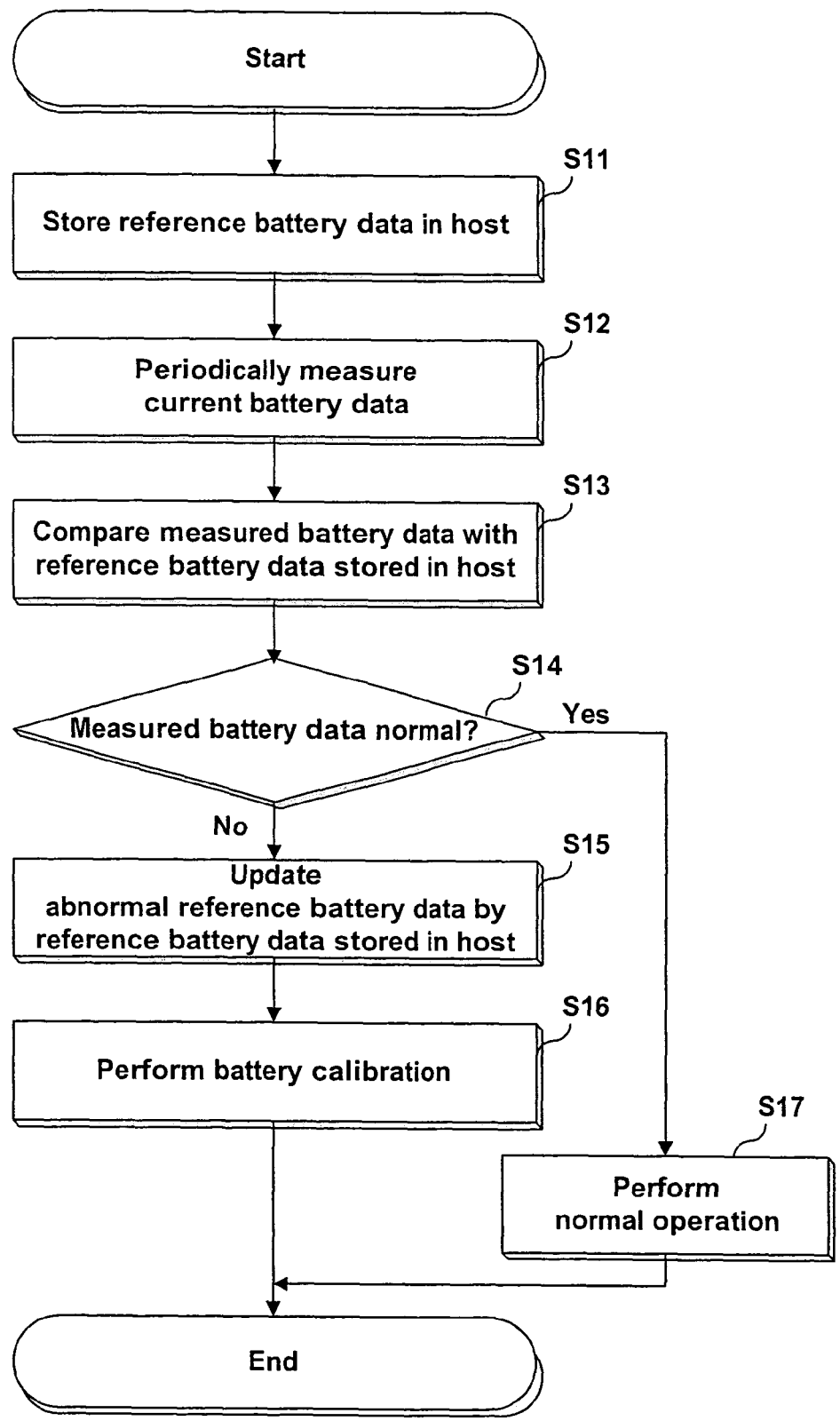
FIG. 3 is a flow chart illustrating the battery data restoring method of the present invention.

FIG. 3 is a flow chart illustrating the battery data restoring method of the present invention.

In accordance with this method, the reference data of the battery 10 set in manufacturing the battery 10 is first inputted to the battery management module 50. The battery controller 504 of the battery management module 50 stores the inputted reference battery data in the memory 507.

When the battery management module 50 is subsequently connected to the host 30, it sends the reference battery data to the host 30 which, in turn, stores the reference battery data in a certain memory in the form of a backup file (S10).

Once the reference battery data is stored as backup data, the battery management module 50 periodically measures actual battery data such as the current voltage, current, and temperature associated with the battery 10 (S12). The measurement of the battery data associated with voltage, current and temperature is carried out by respective sensors, that is, the voltage sensor 501, current sensor 502, and temperature sensor 503.

The measured battery data is sent to the host 30 via the host interface 505 under the control of the battery controller 504. The host 30 compares the measured battery data received thereto with the reference battery data stored in its memory (S13), thereby determining whether or not the measured battery data has been damaged (S14). When it is determined at step S14 that the measured battery data has been damaged, the host 30 sends the stored reference battery data to the battery management module 50.

When the battery management module 50 receives the reference battery data, it overwrites the received reference battery data on the memory area of the memory 507 where the damaged battery data is stored, thereby updating the reference battery data (S15).

The battery management module 50 then performs a calibration process to correct the updated reference battery data based on the current actual battery data (S16). Thereafter, the battery management module 50 sends, to the host 30, the reference battery data corrected in accordance with the calibration process.

The host 30 stores the corrected reference battery data, received thereto, in its memory.

On the other hand, where it is determined at step S14 that the measured battery data is not damaged, the battery management module 50 carries out serial communications with the host 30 to perform a normal operation (S17).

As apparent from the above description, the present invention provides a method for restoring battery data in a portable appliance which is capable of making a battery be normally used even when the reference data of the battery is damaged, thereby preventing an abnormal operation of the battery charging system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for restoring battery data in a portable appliance comprising:
    receiving reference battery data internally set in a battery and adapted to manage the battery, and storing the received reference battery data as a backup data;
    assessing the battery data periodically measured with the reference battery data set in the battery to determine current battery characteristics;
    comparing battery data periodically measured for the battery with the stored reference battery data to monitor the measured battery data; and
    updating the reference battery data set in the battery by the stored reference battery data when it is determined in accordance with the comparison that the measured battery data is damaged.

2. The battery data restoring method according to claim 1, further comprising:
    after the update of the reference battery data, performing a calibration process for re-setting the battery reference data in accordance with a current capacity of the battery.

3. The battery data restoring method according to claim 1, wherein the reference battery data comprises temperatures-based reference voltage, current and capacity data of the battery.

4. The battery data restoring method according to claim 1, wherein the measured battery data comprises at least one of temperature, voltage and current data.

5. The battery data restoring method according to claim 1, wherein the backup data is stored outside a battery module in the portable appliance.

6. The battery data restoring method according to claim 5, wherein the backup data is stored in a host microprocessor of the portable appliance.

7. The battery data restoring method according to claim 2, restoring the reset battery reference data as the backup data.

8. The battery data restoring method according to claim 1, wherein the comparing comprises determining whether the measured data is distorted.

9. An apparatus for restoring battery data in a portable appliance comprising:

means for receiving reference battery data internally set in a battery and adapted to manage the battery, wherein the received reference battery data is stored as a backup data;

means for assessing the battery data periodically measured with the reference battery data set in the battery to determine current battery characteristics;

means for comparing battery data periodically measured for the battery with the stored reference battery data to monitor the measured battery data; and means for updating the reference battery data set in the battery using the backup data when the comparison determines that the measured battery data is damaged.

10. The apparatus of claim 9, further comprising:

means for performing a calibration process for re-setting the backup data in accordance with a current capacity of the battery after the update of the reference battery data.

11. The apparatus of claim 9, wherein the reference battery data comprises temperatures-based reference voltage, current and capacity data of the battery, and wherein the measured battery data comprises at least one of temperature, voltage and current data.

12. A method for restoring battery data in a portable appliance comprising:

receiving reference battery data internally set in a battery and adapted to manage the battery, and storing the received reference battery data as a backup battery data in a host computer;

comparing battery data periodically measured for the battery with the stored reference battery data to determine current battery characteristics;

determining in the host computer, based on a comparison with the stored backup data, when the battery data periodically measured is damaged; and updating the reference battery data set in the battery using the backup battery data when it is determined in accordance with the comparison that the measured battery data is damaged.

13. The battery data restoring method according to claim 12, further comprising:

after the update of the reference battery data, performing a calibration process for re-setting the backup battery data in accordance with a current capacity of the battery.

14. The method according to claim 12, wherein the reference battery data comprises temperatures-based reference voltage, current and capacity data of the battery, and wherein the measured battery data comprises at least one of temperature, voltage and current data.

* * * * *